(12) United States Patent
Schmidt et al.

(10) Patent No.: US 11,343,961 B2
(45) Date of Patent: May 31, 2022

(54) CUTTING DEVICE FOR AN AGRICULTURAL HARVESTING MACHINE

(71) Applicant: SMF—HOLDING GMBH, Eichelhardt (DE)

(72) Inventors: Ralf Schmidt, Mörsbach (DE); Sascha Otto, Racksen (DE)

(73) Assignee: SMF—HOLDING GMBH, Eichelhardt (DE)

( * ) Notice: Subject to any disclaimer, the term of this patent is extended or adjusted under 35 U.S.C. 154(b) by 28 days.

(21) Appl. No.: 16/761,555

(22) PCT Filed: Nov. 5, 2018

(86) PCT No.: PCT/EP2018/080204
§ 371 (c)(1),
(2) Date: May 5, 2020

(87) PCT Pub. No.: WO2019/091927
PCT Pub. Date: May 16, 2019

(65) Prior Publication Data
US 2020/0260641 A1    Aug. 20, 2020

(30) Foreign Application Priority Data

Nov. 7, 2017  (DE) ...................... 20 2017 106 738.6

(51) Int. Cl.
*A01D 34/30* (2006.01)
*A01D 34/14* (2006.01)
*A01D 34/18* (2006.01)

(52) U.S. Cl.
CPC ............. *A01D 34/30* (2013.01); *A01D 34/14* (2013.01); *A01D 34/18* (2013.01)

(58) Field of Classification Search
CPC ........ A01D 34/30; A01D 34/14; A01D 34/18; A01D 34/03; A01D 34/145; A01D 34/142
See application file for complete search history.

(56) References Cited

U.S. PATENT DOCUMENTS 1,980,865 A * 11/1934 Kauffman ............... A01G 3/053
30/216
2,226,583 A * 12/1940 Ronning ................ A01D 34/18
56/308

(Continued)

FOREIGN PATENT DOCUMENTS

| CH | 259 041 A | 1/1949 |
| DE | 2 123 369 A1 | 11/1972 |

OTHER PUBLICATIONS

Opinion of Invention Patentability dated Apr. 6, 2021 in Eurasian Application No. 202090885/31.

(Continued)

*Primary Examiner* — Abigail A Risic
(74) *Attorney, Agent, or Firm* — Sughrue Mion, PLLC

(57) ABSTRACT

A cutting device for an agricultural harvesting machine including: a drive; a transmission arrangement having an input element drivingly connected to the drive and driven reciprocatingly by the drive along an input travel; and a knife having a plurality of cutting edges, the knife being drivingly connected to and driven by an output element of the transmission arrangement along an output travel longer than the input travel, is driven in a reciprocating motion in such a way that the cutting edges of the knife pass in each case at least two counter-cutting edges of the cutting device when moving in one direction along the entire output travel.

6 Claims, 3 Drawing Sheets

(56) References Cited

U.S. PATENT DOCUMENTS

| | | | | |
|---|---|---|---|---|
| 2,269,007 | A * | 1/1942 | Clark | A01D 34/84 |
| | | | | 56/16.9 |
| 3,517,494 | A * | 6/1970 | Beusink | A01D 34/30 |
| | | | | 56/293 |
| 4,048,791 | A * | 9/1977 | Treen | A01D 34/02 |
| | | | | 56/17.6 |
| 4,198,803 | A | 4/1980 | Quick et al. | |
| 4,866,921 | A * | 9/1989 | Nagashima | A01D 34/30 |
| | | | | 56/257 |
| 5,157,906 | A | 10/1992 | Abrahamson | |
| 6,510,681 | B2 | 1/2003 | Yang et al. | |
| 10,765,060 | B2 * | 9/2020 | Schuler | A01D 34/04 |
| 2009/0145097 | A1 * | 6/2009 | Priepke | A01D 34/30 |
| | | | | 56/257 |
| 2009/0145264 | A1 * | 6/2009 | Priepke | A01D 34/30 |
| | | | | 74/84 R |
| 2015/0305233 | A1 * | 10/2015 | Surmann | A01D 34/145 |
| | | | | 56/10.1 |
| 2021/0045288 | A1 * | 2/2021 | Sorensen | A01D 34/30 |
| 2021/0137002 | A1 * | 5/2021 | Dunn | A01D 34/30 |

OTHER PUBLICATIONS

International Search Report of PCT/EP2018/080204 dated Mar. 19, 2019 [PCT/ISA/210].

* cited by examiner

CUTTING DEVICE FOR AN AGRICULTURAL HARVESTING MACHINE

CROSS REFERENCE TO RELATED APPLICATIONS

This application is a National Stage of International Application No. PCT/EP2018/080204, filed Nov. 5, 2018, claiming priority to Germany Patent Application No. 20 2017 106 738.6, filed Nov. 7, 2017.

BACKGROUND OF THE INVENTION

Field of the Invention

The invention relates to a cutting device for an agricultural harvesting machine with a knife that is driven in a reciprocating motion.

Background

Well-known mower knife drives are realized by different types of construction. Transmission arrangements are used here which convert a rotary motion into a reciprocating motion and are connected to a knife head of the knife to drive it in an oscillating manner.

DE 37 11 265 A1 describes a drive for a double knife of a cutter bar with one oscillating lever each driving an upper and lower knife and mounted so as to pivot about a vertically arranged oscillating shaft. The oscillating levers are driven in opposite directions by a crank drive, a drive lever that transforms the crank motion of the crank drive into an oscillating motion, and drive means that connect the two oscillating levers. Each oscillating shaft has a toothed segment as drive means, whereby the toothed segments interlock with each other.

The U.S. Pat. No. 6,273,214 B1 shows an angular transmission arrangement for driving a mowing knife. A first transmission unit is provided, which converts a rotary movement into a translatory movement to drive the mowing knife. A second transmission unit in the form of an angular transmission is also provided. The second transmission unit is used to change the direction of rotation, as the drive unit is driven by a remote motor via a belt drive and belt pulley. The rotation of the belt pulley, which rotates around a horizontal axis, must be redirected into a rotational movement around a vertical axis.

There are also drive concepts in which a rotating drive is connected to the mowing knife by a coupling rod, whereby the coupling rod is connected to the mowing knife by a pivot bearing or wobble bearing, whereby the rotary motion of the drive is converted into a reciprocating motion of the mowing knife.

With all drive concepts known so far, a maximum stroke of the mowing knife is limited by the installation space for the drive. Ever shorter harvesting cycles and more powerful harvesting machines require higher throughput, which can be achieved, for example, by increasing travel speed to ensure increased efficiency of the threshing units and the entire harvesting machine, including in areas with low crop densities.

This results in the need for a higher throughput at the cutting system. Cutting devices usually provide for one cut per knife blade of the knife during an outward or return movement. An increase in the throughput at the cutting device would therefore be possible by increasing the speed of the drive to thereby increase the cutting speed. However, this leads to an increased load, especially when passing the turning points of the back and forth movement, which requires reinforcement and thus an increase in the weight of the drive components.

The object of the present invention is therefore to provide a cutting device which ensures a higher throughput without a significant increase in the weight of the drive components.

The object is met with a cutting device for an agricultural harvesting machine, which has a drive, a transmission arrangement and a knife. The transmission arrangement has an input element that is drivingly connected to the drive and is driven back and forth by the drive along an input travel. The knife has a plurality of cutting edges. The knife is drivingly connected to an output element of the transmission arrangement and is driven back and forth by the latter along an output travel which is longer than the input travel in such a way that the cutting edges of the knife, when moving in one direction along the entire output travel, pass at least two counter-cutting edges of the cutting device in each case.

This means that the number of cuts per stroke length can be increased at the same speed. Where nowadays usually one cut per stroke is made, two or more cuts can be made. For example, with a knife stroke of 80 mm, which is widely used nowadays, this can be increased to 160 mm, i.e. doubled. This also allows the number of cuts per stroke to be doubled.

In this case the transmission arrangement may be a traction drive arrangement, the input element being a traction means, for example an input traction drive of the traction drive arrangement.

The transmission arrangement may have a drive pulley driven by the input traction means. Further, the transmission arrangement may include an output pulley coaxially connected to the drive pulley and driving an output traction means, the drive pulley having a smaller diameter than the output pulley. This ensures a simple structure to increase the stroke.

Alternatively, the transmission arrangement can have a transmission element that can be pivoted or rotated to and fro to a limited extent about a pivot axis. Here the transmission element can be coupled with the input element. Furthermore, the transmission element can be coupled to an output element which is drivingly connected to the knife, whereby the input element is coupled to the transmission element at a smaller distance from the pivot axis than the output element.

In one embodiment, the transmission element can be a lever. The output element can be a coupling element by means of which the lever is drivingly connected to the knife.

The transmission element can alternatively be a belt pulley, whereby in one embodiment the output element can be a belt.

Furthermore, according to another embodiment, it can be provided that the transmission element is a gear wheel and the output element is a toothed element meshing with the gear wheel, for example a pinion.

The counter-cutting edges can be formed by mowing fingers, whereby the mowing fingers are arranged at the same distance, for example 3 inches, from each other as the cutting edges of the knife. Other cutting systems, such as 4-inch cutting systems or other distances are also conceivable.

BRIEF DESCRIPTION OF THE DRAWINGS

The invention is explained in more detail in the following drawings. Herein

DETAILED DESCRIPTION OF THE INVENTION

Figure 1:
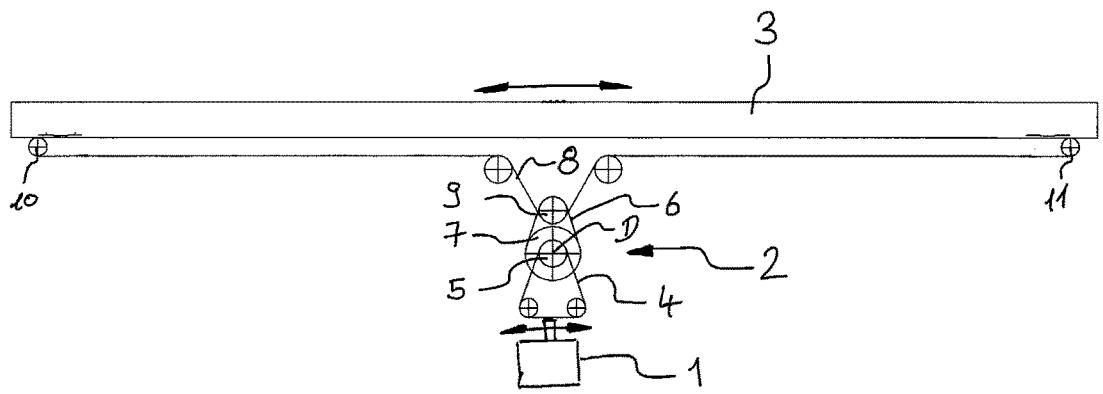
FIG. 1 shows a first embodiment of a cutting device according to the invention with a traction drive arrangement as the transmission arrangement.

The first embodiment according to FIG. 1 shows a drive 1, a transmission arrangement 2 in the form of a traction drive arrangement and a knife 3 in the form of a mowing knife. Knife 3 is only shown schematically, without knife blades being visible.

In this embodiment, drive 1 is drivingly connected to an input element in the form of an input traction means 4, whereby drive 1 drives the input traction means 4 in an oscillating back and forth motion, as indicated by the double arrow on drive 1.

The input traction means 4 wraps around a drive pulley 5 and drives it. The drive pulley 5 is mounted rotatably about a axis of rotation D. The drive pulley 5 is further connected to an output pulley 7, the output pulley 7 being arranged coaxially to the axis of rotation D and being firmly connected to the drive pulley 5 so that the output pulley is rotated together with the drive pulley 5 or is driven in oscillating rotation by the input traction means 4.

The cutting device shown in FIG. 1 further comprises a driven traction means 6, which wraps around the output pulley 7 and is coupled with an intermediate pulley 9. A coupling traction means 8 is drivingly connected via the intermediate pulley 9 as the output element of the transmission arrangement 2, the coupling traction means 8 being attached to the knife 3 at two ends of the knife 3 facing away from each other via diversion pulleys 10, 11. The Knife 3 is thus driven back and forth according to the double arrow shown on knife 3.

The diameter of the output pulley 7 is larger than the diameter of the drive pulley 5. Thus the travel (input travel), which the input traction means 4 is moved back and forth by the drive 1, is translated into a larger output travel, which the output traction means 6 and thus the knife 3 is moved back and forth linearly. The output travel of the output traction means 6 is here just as large as the back and forth travel of the coupling traction means 8, so that the knife 3 is also moved back and forth over a distance corresponding to the length of the output travel.

Figure 2:
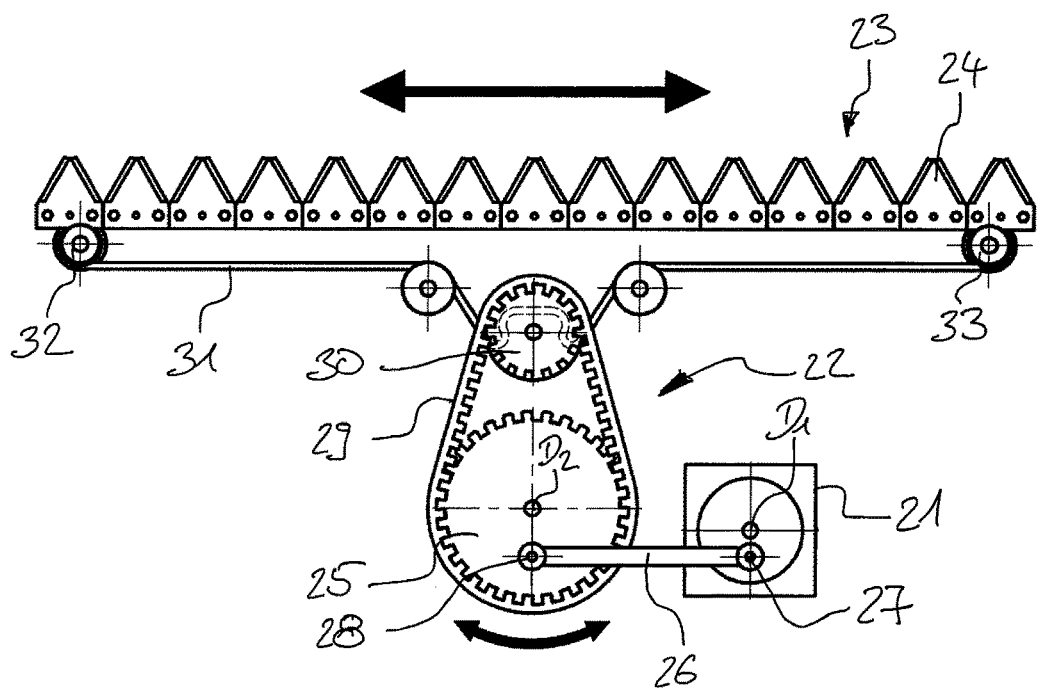
FIG. 2 shows a second embodiment of a cutting device according to the invention with an alternative traction drive arrangement.

FIG. 2 shows a second embodiment of a cutting device according to the invention with a transmission arrangement 22 in the form of a traction drive arrangement. The second embodiment has a drive 21, the transmission arrangement 22 and a knife 23, wherein the knife 23 is equipped with a plurality of knife blades 24.

The drive 21 is drivingly connected via a coupling rod 26 with a transmission element in the form of a toothed belt pulley 25. The coupling rod 26 is connected to the drive 21 via a pivot point 27, wherein the pivot point 27 is driven in rotation about a first axis of rotation D1.

The coupling rod 26 is connected to the toothed belt pulley 25 via an input element 28 of the toothed belt pulley 25, wherein the toothed belt pulley 25 oscillates back and forth around a second axis of rotation D2, as indicated by the arc-shaped double arrow. The input element 28 can be a pivot bearing.

The toothed belt pulley 25 is wrapped by a toothed belt 29, which is also wrapped around an intermediate pulley 30. In this case, the outer diameter of the toothed belt pulley 25, around which the toothed belt 29 wraps, is larger than the diameter on which the input element 28 is located. This ensures that the length of the input travel moved by the input element 28 during its reciprocating movement is less than the length of the travel moved by the toothed belt 29.

The back and forth movement of the toothed belt 29 is transmitted via the intermediate pulley 30 to a coupling belt 31, which performs approximately the same back and forth travel as the toothed belt 29, so that the back and forth travel of the coupling belt 31 is also greater than the back and forth travel (input travel) of the input element 28.

The coupling belt 31 is attached to the opposite ends of the knife 30 by means of diversion pulleys 32, 33, analogous to the first embodiment, so that the knife 30 is also driven in a linear back-and-forth movement, the length of the output travel that the knife 23 is moved back and forth corresponding to the length of the travel of the coupling belt 31. Thus, the back and forth movement of input element 28 is also translated in such a way that the length of the output travel of the knife 23 is greater.

Figure 3:
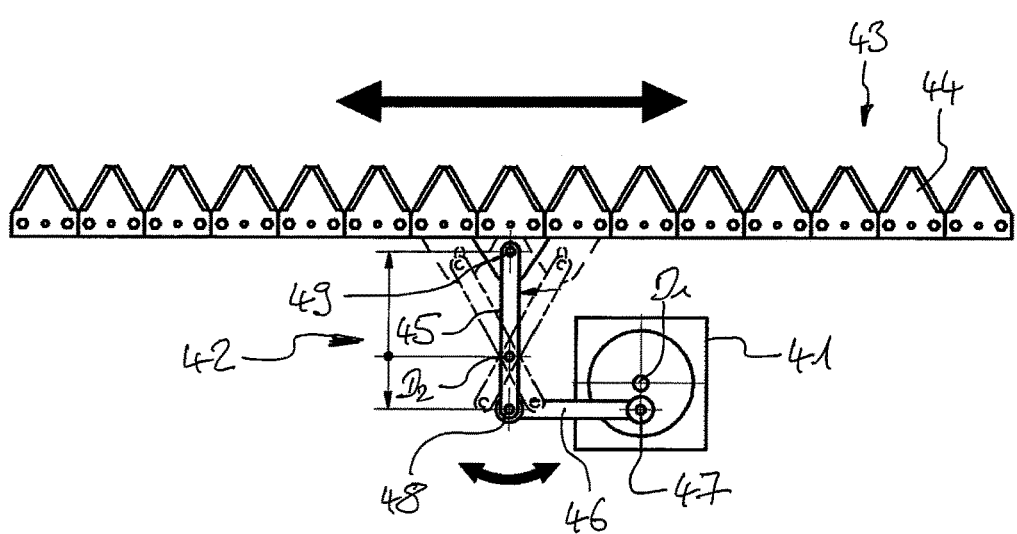
FIG. 3 shows a third embodiment of a cutting device according to the invention with a transmission element in the form of a lever.

FIG. 3 shows a third embodiment of a cutting device according to the invention with a transmission arrangement 42 in the form of a lever transmission arrangement. The third embodiment has a drive 41, the transmission arrangement 42 and a knife 43, wherein the knife 43 is equipped with a plurality of knife blades 44.

The drive 41 is drivingly connected via a coupling rod 46 with a transmission element in the form of a lever 45. The coupling rod 46 is connected to the drive 41 via a pivot point 47, wherein the pivot point 47 is driven in rotation about a first axis of rotation D1.

The coupling rod 46 is connected to the lever 45 via an input element 48 of the lever, wherein the lever 25 oscillates back and forth around a second axis of rotation D2, as indicated by the arc-shaped double arrow. The input element 48 can be a pivot bearing.

The lever 45 is pivotally connected to the knife 43 at an end facing away from the input element 48 by means of an output element 49. The output element 49 can be a pivot bearing, which also compensates for a slight relative movement between the lever 45 and the knife 43 transverse to the direction of movement of the knife 43. This is necessary because the end of lever 45, which is connected to knife 43, follows an arc shape.

Thus, the knife 3 is also driven back and forth by the oscillating back and forth movement of lever 45. Here the distance between the input element 48 and the second axis of rotation D2 is smaller than the distance between the output element 49 and the second axis of rotation D2. This ensures that the length of the input travel moved by the input element 48 during its reciprocating movement is less than the length of the output travel moved reciprocatingly by the output element 49 and thereby by the knife 43.

Figure 4:
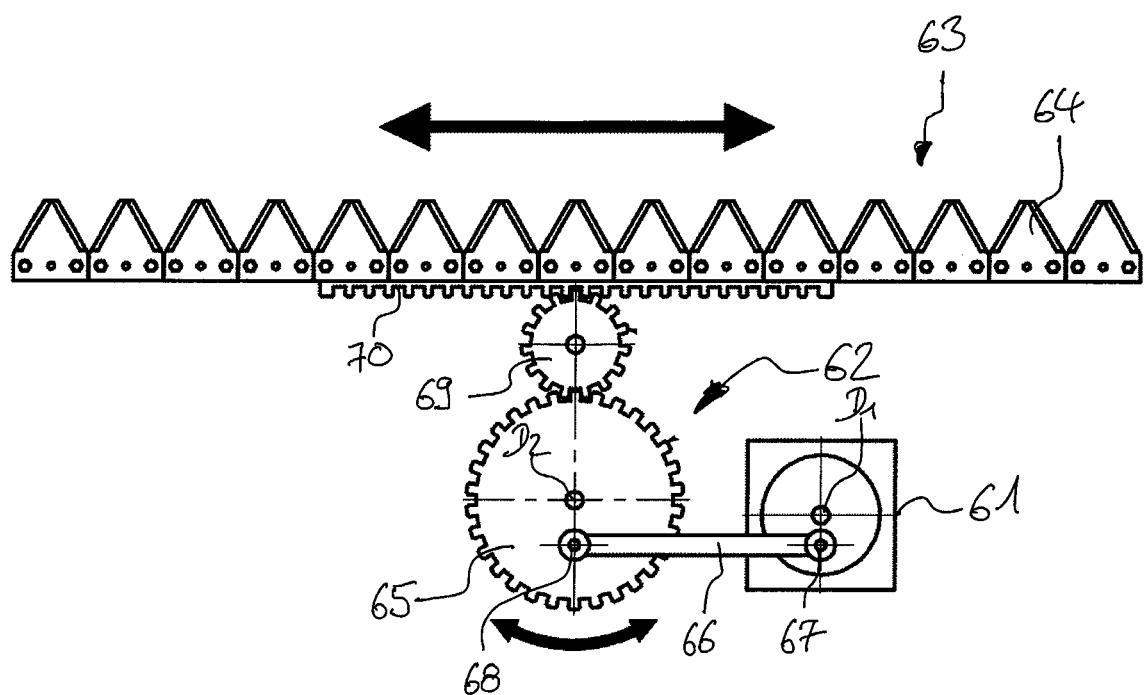
FIG. 4 shows a fourth embodiment of a cutting device according to the invention with a transmission element in the form of a gear wheel.

FIG. 4 shows a fourth embodiment of a cutting device according to the invention with a transmission arrangement 62 in the form of a gear transmission arrangement. The fourth embodiment has a drive 61, the transmission arrangement 62 and a knife 63, wherein the knife 63 is equipped with a plurality of knife blades 64.

The drive 61 is drivingly connected via a coupling rod 66 with a transmission element in the form of a gear wheel 65. The coupling rod 66 is connected to the drive 61 via a pivot point 67, wherein the pivot point 67 is driven in rotation about a first axis of rotation D1.

The coupling rod 66 is connected to the gear wheel 65 via an input element 68 of the gear wheel, wherein the gear wheel 65 oscillates back and forth around a second axis of rotation D2, as indicated by the arc-shaped double arrow. The input element 68 can be a pivot bearing.

Gear wheel 65 is drivingly connected via an output element in the form of a pinion 69 with knife 3. The pinion 69 is in turn meshed with a gear rack 70 of the knife 3, so that the to and fro movement of the pinion 69 drives the gear rack 70 and thus the knife 63 in a linear to and fro movement.

The distance between the input element 68 and the second axis of rotation D2 is smaller than the distance between the point where the pinion 69 is in meshing engagement with the input element 68 and the second axis of rotation. This ensures that the length of the input travel moved by the input element 68 during its reciprocating movement is less than the length of the output travel moved by the knife 63.

Figure 5:
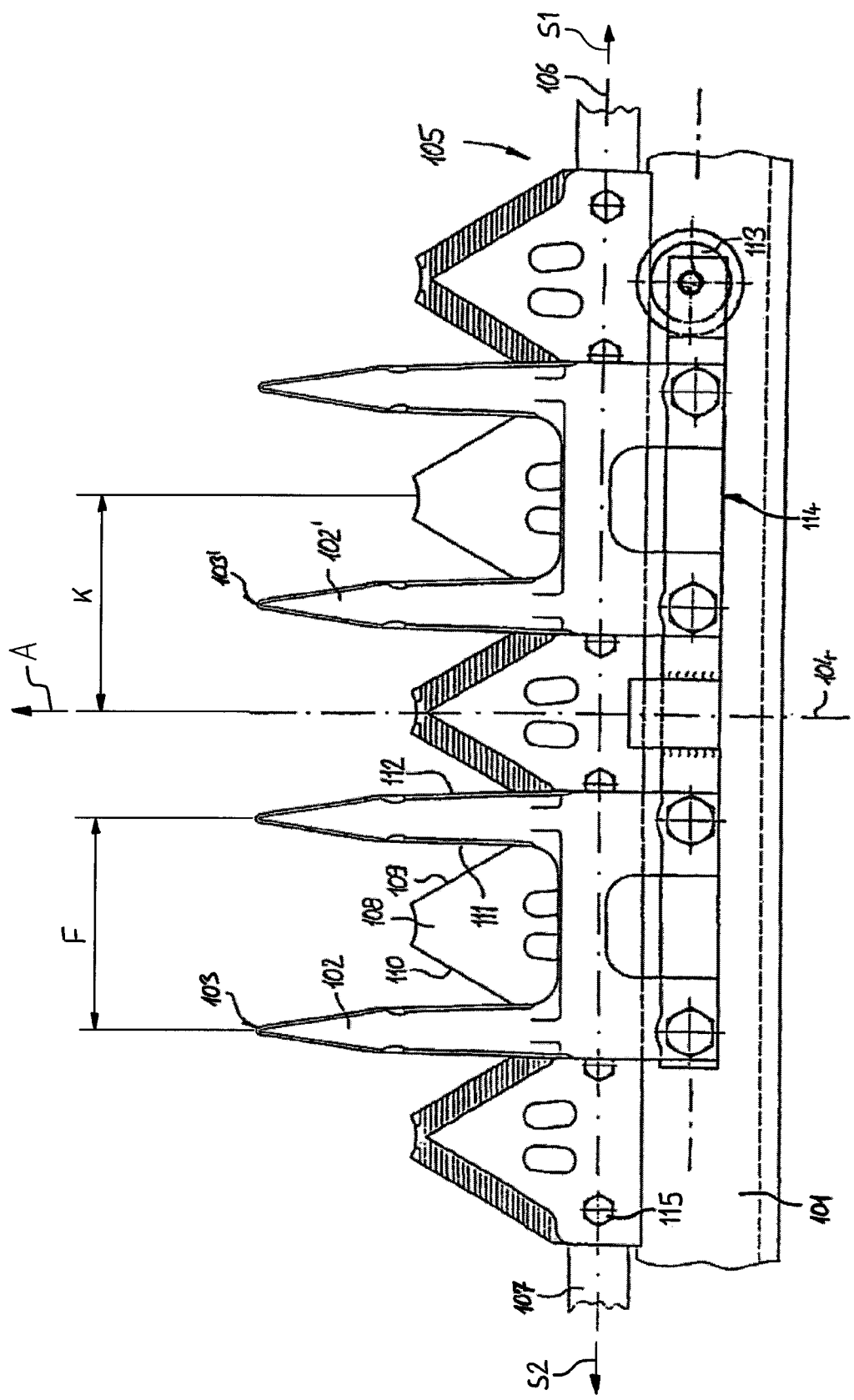
FIG. 5 is a top view of a cutting device according to any of the embodiments shown in FIGS. 1 to 4.

FIG. 5 shows a cutter bar of a cutting device with a finger bar 101, which can be attached to an agricultural harvesting machine. Mowing fingers 102, 102' are arranged on this, with free ends 103, 103' pointing in a working direction A of the agricultural machine and arranged parallel to a longitudinal axis 104. A knife 105 is guided along a transverse axis 106, which runs at right angles to the longitudinal axis 104, in an oscillating movement to the finger bar 101. The knife 105 comprises a knife rail 107 and several knife blades 108 connected to it.

The knife blades 108 each form a first cutting edge 109 and a second cutting edge 110. The first cutting edges 109 each interact with at least a first counter-cutting edge 111 of a mowing finger 102 when the knife 105 is moved in a first cutting direction S1 parallel to the transverse axis 106 relative to the first counter-cutting edges 111 or the mowing fingers 102, 102'. Likewise, the second cutting edges 110 each work together with at least one second counter-cutting edge 112 of the mowing fingers 102 when the knife 105 is moved in a second cutting direction S2 parallel to the transverse axis 106 relative to the second counter-cutting edges 112 or the mowing fingers 102, 102' respectively. The first cutting edges 109 and the first counter-cutting edges 111 as well as the second cutting edges 110 and the second counter-cutting edges 112 are each arranged at an angle to each other and form an angle which is open to the front when viewed in working direction A. Thus, the oscillating movement of the knife 105 results in a cutting movement comparable to that of scissors, so that cutting forces occur in the direction of the longitudinal axis 104 against the working direction A. To support the cutting forces, the knife 105 in the shown exemplary embodiment is supported by rollers 113 against the knife rail 107. The rollers 113 are each attached to the finger bar 101 via roller holders 114. The knife 105 can in principle also be supported against the knife rail 107 without rollers.

For reasons of stability, two mowing fingers 102 are each made from one component and thus form a double finger, which is U-shaped in plan view.

The knife blades 108 are attached to the knife rail 107 with screws 115.

The distance F between two adjacent mowing fingers 102, 102' is the same for all mowing fingers 102, 102'. This distance F also corresponds to the distance of the first counter-cutting edges 111 or the distance of the second counter-cutting edges 111 of two adjacent mowing fingers 102, 102' to each other. The distance K between two adjacent knife blades 108 is also the same for all knife blades 108 and is identical to the distance F between two adjacent mowing fingers 102, 102'. This distance K also corresponds to the distance of the first cutting edges 109 or the distance of the second cutting edges 110 of two adjacent knife blades 108 to each other.

The drive for the knife 105 is designed such that the knife 105 performs a stroke in both cutting directions S1, S2 of at least twice the distance F between two adjacent mowing fingers 102, 102' or twice the distance K between two adjacent knife blades 108. Thus the first cutting edges 109 of the knife 105 pass each at least two first counter-cutting edges 111 when moving in the first cutting direction S1 along the entire stroke. When moving in the second cutting direction S2 along the entire stroke, the second cutting edges 110 of the knife 105 each pass at least two second counter-cutting edges 112. Thus the knife 105 makes at least two complete cuts in the first cutting direction S1 as well as in the second cutting direction S2.

REFERENCE SIGNS LIST

1 Drive
2 Transmission arrangement
3 Knife
4 Input traction means (input element)
5 Drive pulley
6 Output traction means
7 Output pulley
8 Coupling traction means (output element)
9 Intermediate pulley
10 Diversion pulley
11 Diversion pulley
21 Drive
22 Transmission arrangement
23 Knife
24 Knife blade
25 Toothed belt pulley
26 Coupling rod
27 Pivot point
28 Input element
29 Toothed belt
30 Intermediate pulley
31 Coupling belt (output element)
32 Diversion pulley
33 Diversion pulley
41 Drive
42 Transmission arrangement
43 Knife
44 Knife blade
45 Lever
46 Coupling rod
47 Pivot point
48 Input element
49 Output element
61 Drive
62 Transmission arrangement
63 Knife
64 Knife blade
65 Gear wheel
66 Coupling rod 67 Pivot point
68 Input element
69 Pinion (output element)
70 Gear rack
101 Finger bar
102, 102' Mowing finger
103, 103' Free end
104 longitudinal axis
105 Knife
106 Transverse axis
107 Knife rail
108 Knife blade
109 first cutting edge
110 second cutting edge
111 first counter-cutting edge
112 second counter-cutting edge
113 Roller
114 Roller holder
115 Screw
A Working direction
D Axis of rotation
D1 First axis of rotation
D2 Second axis of rotation
S1 First cutting direction
S2 Second cutting direction

The invention claimed is:

1. A cutting device for an agricultural harvesting machine comprising:
   a drive;
   a transmission arrangement having an input element drivingly connected to said drive and driven reciprocatingly by said drive along an input travel, wherein the transmission arrangement is a traction drive arrangement and the input element is a traction means; and
   a knife having a plurality of cutting edges, said knife being drivingly connected to and driven by an output element of said transmission arrangement along an output travel longer than said input travel, is driven in a linear reciprocating motion in such a way that the cutting edges of the knife pass in each case at least two counter-cutting edges of the cutting device when moving in one direction (S1, S2) along the entire output travel.

2. The cutting device according to claim 1, wherein
   the transmission arrangement comprises an drive pulley, which is driven by the input traction means, and an output pulley, which is coaxially connected to the drive pulley and drives an output traction means; and
   wherein the drive pulley has a smaller diameter than the output pulley.

3. The cutting device according to claim 1, wherein
   the transmission arrangement has a transmission element which can be pivoted about a pivot axis (D2);
   wherein the transmission element is coupled to the input element;
   wherein the transmission element is drivingly connected to an output element which is drivingly connected to the knife; and
   wherein the input element is coupled to the translation element at a smaller distance from the pivot axis (D2) than the output element.

4. The cutting device according to claim 3, wherein
   the transmission element is a belt pulley.

5. The cutting device according to claim 1, wherein
   the counter-cutting edges are formed by mowing fingers which are arranged at the same distance (F, K) from one another as the cutting edges of the knife.

6. The cutting device according to claim 5, wherein
   the mowing fingers are each 3 inches apart from an adjacent mowing finger.

* * * * *